United States Patent
Bennett et al.

[11] Patent Number: 5,943,810
[45] Date of Patent: Aug. 31, 1999

[54] FISH BAIT PROTECTOR

[76] Inventors: Theo L. Bennett, 501 W. Nasa Rd. #1, Webster, Tex. 77598; Joseph H. Sanford, 6803 Greenbriar East, Santa Fe, Tex. 77510

[21] Appl. No.: 09/018,166

[22] Filed: Feb. 3, 1998

[51] Int. Cl.⁶ .................................................... A01K 97/04
[52] U.S. Cl. .................................................. 43/41; 43/41.2
[58] Field of Search ..................................... 43/36, 37, 41, 43/43.11, 43.12, 43.15, 41.2

[56] References Cited

U.S. PATENT DOCUMENTS

| | | | |
|---|---|---|---|
| 1,764,738 | 6/1930 | Marsters | 43/41 |
| 3,273,277 | 9/1966 | Valentine | 43/41 |
| 3,939,593 | 2/1976 | East | 43/41.2 |
| 3,940,873 | 3/1976 | Lawless | 43/57.1 |
| 4,418,490 | 12/1983 | Ancona | 43/25.2 |
| 4,760,665 | 8/1988 | Stueber | 43/36 |
| 4,961,280 | 10/1990 | Hudson | 43/44.99 |

FOREIGN PATENT DOCUMENTS

| | | | |
|---|---|---|---|
| 163389 | 5/1958 | Sweden | 43/41 |
| 81/00186 | 2/1981 | WIPO | 43/41 |

*Primary Examiner*—Kurt Rowan
*Assistant Examiner*—Fredrick T. French, III
*Attorney, Agent, or Firm*—Bracewell & Patterson, L.L.P.

[57] ABSTRACT

A fish bait protector for protecting baited fishing hooks from disturbance as the hooks are lowered within a body of water. As the baited fishing hooks are lowered within the body of water, the hooks are surrounded by a protective enclosure of the fish bait protector to prevent upper and middle depth fish from disturbing the bait. When the fish bait protector reaches a desired fishing depth such as the fishing depth at a bottom surface of the body of water, a release mechanism such as a spring latch of the fish bait protector may be used to pull the hooks up and out of the protective enclosure. While the fish bait protector is being lowered, the release mechanism maintains the protective enclosure in a locked position. The fish bait protector thus provides a locked position for protecting baited hooks while being lowered within a body of water and an unlocked position allowing access by low depth fish to the baited hooks after the protective enclosure reaches a desired fishing depth.

22 Claims, 2 Drawing Sheets

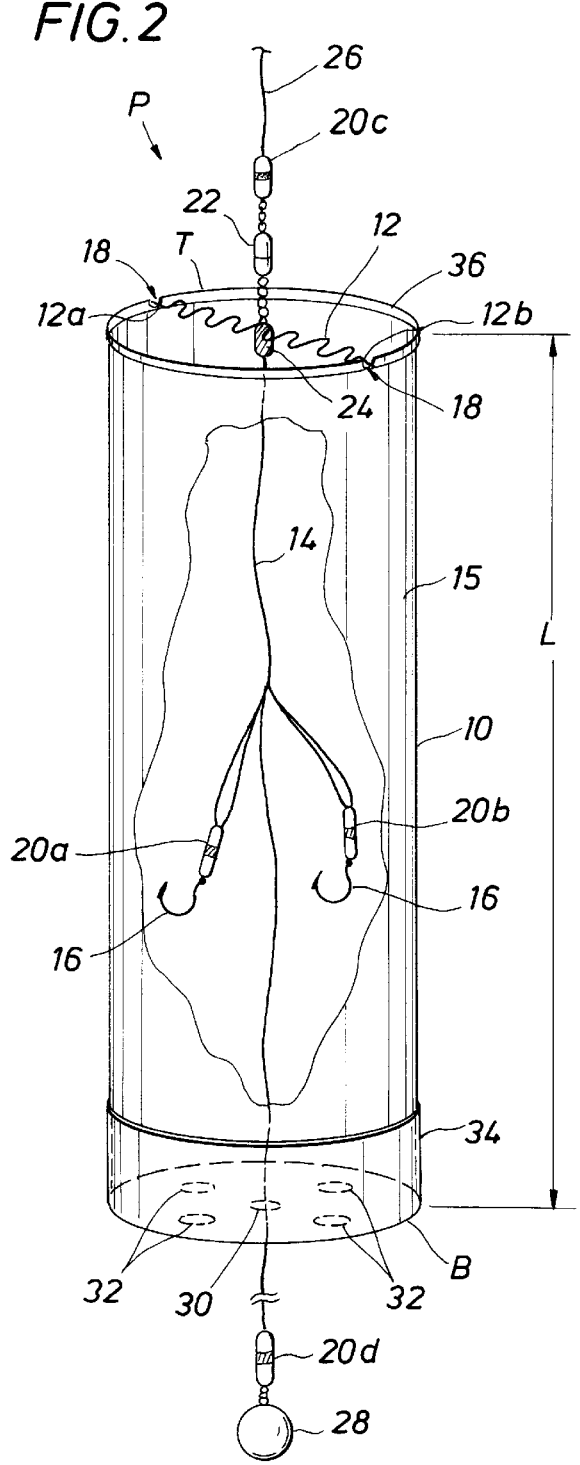
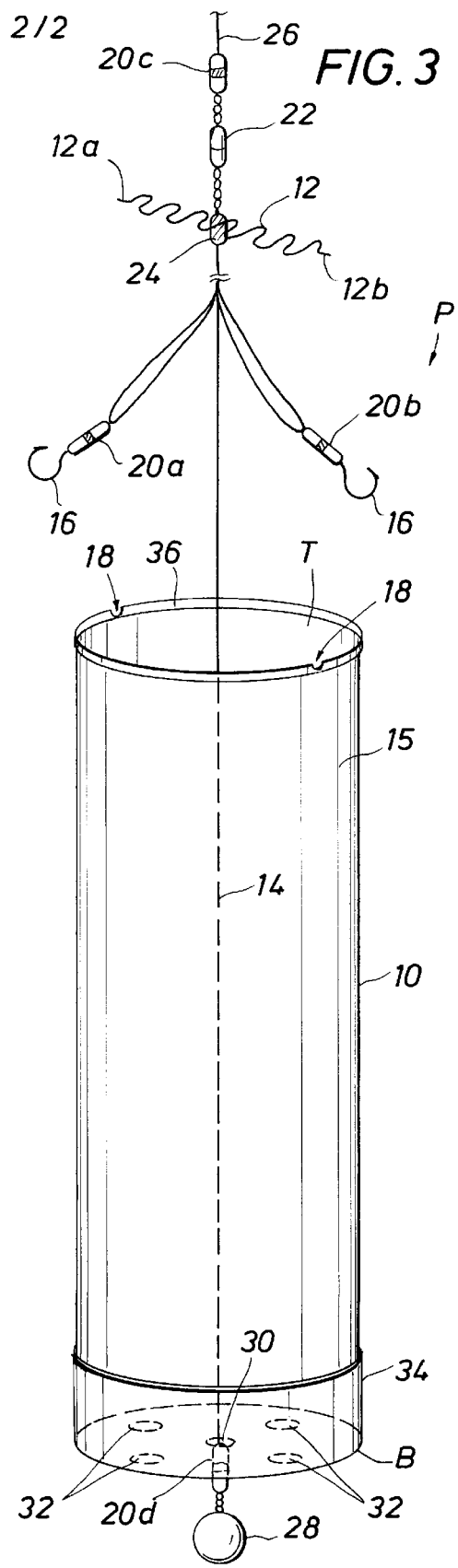

FISH BAIT PROTECTOR

BACKGROUND OF THE INVENTION

1. Field of the Invention

The present invention relates to fishing, and more particularly to a fish bait protector for protecting baited fishing hooks from disturbance as the hooks are lowered into a body of water.

2. Description of the Related Art

There are several types of fish which normally are located in deeper portions of bodies of water. These fish also typically feed at these lower depths or depth. Fishing for these fish, often termed bottom feeders, in a deep body of water has been a frustrating process. When baited hooks were lowered through the water to the lower depths to catch bottom feeding fish, other undesirable fish at middle or upper depths were attracted by the bait. These middle or upper depth fish could thus consume or damage bait on the hooks before the hooks were at the depth to attract lower depth fish. Red snapper, grouper, halibut or any species of fish, at any depth, may be positioned under any species of fish which is less desirable, and tries to disturb baited hooks, as the baited hooks pass by. In many deep-water fishing areas, lower depth fish such as bass, trout, and catfish are larger and often tastier than middle and upper depth fish. For this and other reasons, lower depth fish therefore are more prized than middle and upper depth fish. Given the necessity of lowering baited hooks through regions of upper and middle depth feeding fish, lowering bait undisturbed to these prized lower depth fish has proved difficult.

SUMMARY OF THE INVENTION

Briefly, the present invention provides a fish bait protector for protecting fishing hooks containing bait from disturbance by middle and upper depth fish as the hooks are lowered within a body of water. The protector of the present invention includes an enclosure for the baited hook which is releasable at a depth at or very near the bottom of the body of water. As the hooks are lowered within the body of water, the hooks are surrounded by the protective enclosure to prevent middle and upper depth fish from disturbing the bait. The protective enclosure has an open top end sized for receiving a fishing line and the baited hooks. The protective enclosure also includes a lower passage, either an open bottom or a closed bottom having an opening, to allow the fishing line to slide through the protective enclosure.

When an angler detects that the fish bait protector reaches a desired depth of fish such as at or near the bottom of the body of water, the angler pulls up on his or her fishing rod. A release mechanism of the fish bait protector such as a spring latch causes the hooks to be pulled up and out of the protective enclosure. While the fish bait protector is being lowered, the release mechanism maintains the hooks within the protective enclosure. The fish bait protector thus provides a locked position for protecting bait while bait is being lowered and an unlocked position allowing access by lower depth fish to bait after the protective enclosure reaches a desired fishing depth.

The fishing line within the protective enclosure may be a leader line with a leader clip and/or swivel at each end of the line. When the fish bait protector is in a locked position, one leader clip may be above the protective enclosure, with other leader clips connected to fishing hooks being within the protective enclosure. At least one other leader clip may also be connected to a weight below the protective enclosure. When the fish bait protector is in an unlocked position, each leader clip and the baited fishing hooks are accessible, since they are outside the protective enclosure. In addition, the length of the leader line used with the fish bait protector may be varied to target a specific depth or type of fish. The fishing line may also contain connector sleeves in order to fasten swivels, leader clips, weights and springs to the leader line.

BRIEF DESCRIPTION OF THE DRAWINGS

The present invention may be more readily described and understood by reference to the accompanying drawings in which:

FIG. 2 is a side elevation view, partly broken away, of a fish bait protector of the present invention having a protective enclosure in a locked position; and FIG. 3 is another side elevation view, partly broken away, of the fish bait protector of FIG. 2 having its protective enclosure in an unlocked position.

DETAILED DESCRIPTION OF INVENTION

Figure 1:
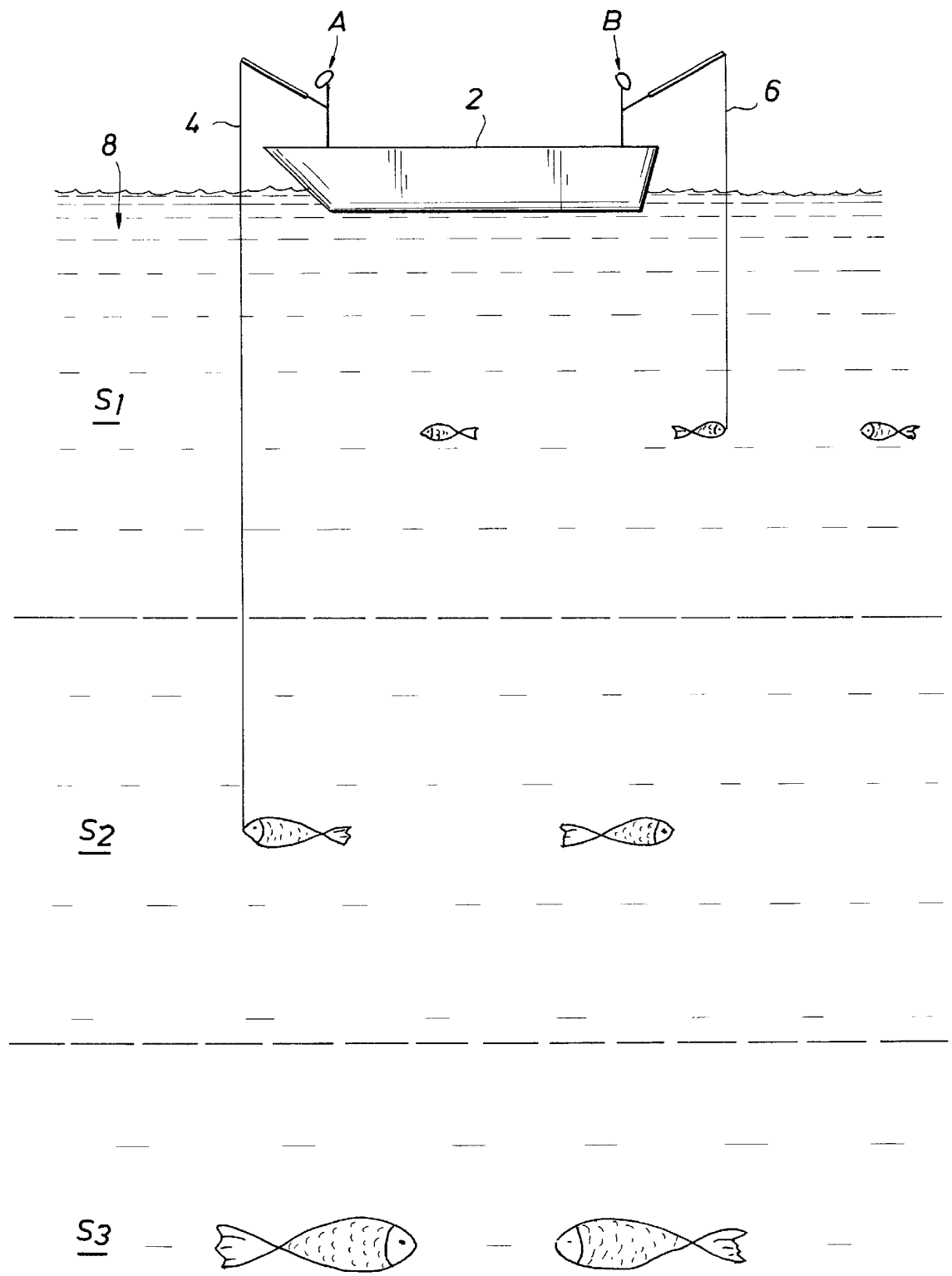
FIG. 1 is a diagram of two anglers fishing in a deep body of water having multiple depth of fish.

Turning now to the drawings, FIG. 1 is a diagram of two anglers A and B fishing from a boat 2 in a deep body of water 8 having fish of several types, each typically being located at multiple different depths or depth in the water body. Fishing in a body of water may of course be performed from a boat as shown and also from a stationary body or location in a body of water.

The illustrated body of water includes three example depths, each containing one or more types of fish, an upper depth of fish $S_1$, a middle depth of fish $S_2$, and a lower depth of fish $S_3$. In order to drop bait on a line to a lower depth of fish $S_3$, it is necessary for the line to pass through the upper depth of fish $S_1$ and the middle depth of fish $S_2$. Lower depth fish $S_3$ are typically the larger and often tastier fish in comparison to middle depth fish $S_2$ and upper depth fish $S_1$. Lower depth fish $S_3$ are therefore more prized than middle and upper depth fish $S_2$ and $S_1$. For this particular example, middle depth fish $S_2$ are illustrated as larger than upper depth fish $S_1$, and lower depth fish $S_3$ are illustrated as larger than both upper depth fish $S_1$ and middle depth fish $S_2$. Fishing for lower depth fish $S_3$ in the past has been frustrated by middle depth fish $S_2$ and upper depth fish $S_1$ consuming or damaging bait being lowered on a fishing line before the bait reaches the lower depth fish $S_3$. In the case illustrated, the bait lowered on a line 4 by angler A is snagged by a middle depth fish $S_2$, and the bait lowered on a line 6 by angler B is snagged by an upper depth fish $S_1$. The illustrated example should cause one to appreciate the difficulty of lowering bait undisturbed to the lower depth fish $S_3$. Fast-sinking lines and weighted flies have been attempted as remedies, but this frustration for anglers has persisted.

In accordance with the present invention, a fish bait protector P (FIGS. 2 & 3) is provided to permit bait to be lowered to lower depth fish $S_3$ without disturbance by middle and upper depth fish $S_1$ and $S_2$. Referring to FIG. 2, a fish bait protector P of the present invention is shown. The fish bait protector P includes a generally cylindrical protective enclosure 10. The protective enclosure 10 is normally in a locked position or state (FIG. 2) as the baited hooks are lowered through the body of water 8. At or near the floor or bottom of the body of water, the enclosure is moved to an unlocked position (FIG. 3). In the locked position, the protective enclosure 10 surrounds fishing hooks 16 containing bait (not shown) as the hooks 16 are lowered within the body of water 8. The protective enclosure 10 thus prevents middle and upper depth fish $S_1$ and $S_2$ from disturbing the bait.

In the disclosed embodiment, the protective enclosure 10 is a cylindrical or tubular canister member 15. The enclosure 10 is preferably made of a material resilient to water and rusting, such as either polyvinyl chloride (PVC) or stainless steel. It should be understood that the protective enclosure 10 might, however, be made of any other suitable material that is sufficiently lightweight so as not to impair the typical fishing motions of an angler.

While the protected enclosure 10 is illustrated as preferably cylindrical, it should be understood that the cross-sectional shape of the protective enclosure 10 might vary. Further, the length L of the protective enclosure P may vary depending on the number of hooks to be provided within the protective enclosure P. The disclosed protective enclosure embodiment P includes an open top end T and an open bottom end B. The circumference of the top end T is of sufficiently small size as to prevent middle and upper depth fish $S_2$ and $S_1$ from entering the protective enclosure. Typically, a fish small enough in size to be able to enter enclosure 10 would also serve as bait for lower depth fish $S_3$.

The open bottom end B of the protective enclosure canister 15 may be covered by a cap 34 made of material similar to either PVC or stainless steel. The cap 34 includes a hole 30 for passage of a leader line 14 through the protective enclosure 10 and holes 32 for passage of water as the protective enclosure is lowered. The length of the leader line 14 may be varied to target a specific depth of fish. A portion of the leader line 14 locatable within the protective enclosure 10 in its locked state is connected to a plurality of leader clips 20a and 20b which are connected to a plurality of hooks 16. The number of hooks used may be any desirable number, so long as in conformance with relevant wildlife conservation regulations or laws.

A portion of the leader line 14 below the protective enclosure 10 is connected to a leader clip 20d, to which is connected a weight 28 which functions as a sinker. The weight 28 contributes to the sinking of the protective enclosure 10. The holes 32 for passage of water limit the drag on the fishing line 26 by ensuring that the capped protective enclosure 10 remains sufficiently negatively buoyant as the protective enclosure 10 is lowered within a body of water.

In the fish bait protector P, a spring latch or other releasable mechanism 12 is used for maintaining the protective enclosure 10 in a locked or protected position during lowering movement in the body of water 8. The latch 12 is fixedly mounted at or near an upper portion of the leader line 14, above the hooks 16. The protective enclosure 10 includes grooves or notch 18 formed into the top end T for receiving opposite outer ends 12a and 12b of the spring latch 12. When the outer ends 12a and 12b of the spring latch 12 engage the grooves 18, the spring latch 12 is compressed, such that the latch 12 is held in place at the top end T of the protective enclosure 10. The top end T may include a rim 36 that helps to provide tension between the spring latch 12 and the grooves 18.

The spring latch 12 is connected to a leader clip 24 that is connected to a swivel 22, which allows for rotation of the protective enclosure 10. The swivel 22 is connected to a leader clip 20c that is connected to a fishing line 26. The fishing line 26 extends back to a fishing rod of an angler. The leader clip 24 is also connected to the leader line 14. The leader clip 24 thus allows for connection of the fishing line 26 and the leader line 24 to the spring latch 12. The fishing line 26 may also contain connector sleeves in order to fasten swivels, leader clips, weights, and springs to the leader line 14.

It should be understood that other components may alternatively be used for connecting the fishing line 26 and the leader line 24 to the spring latch 12. Maintaining the spring latch 12 in a fixed position at the top end T of the protective enclosure 10 keeps the hooks 16 within the protective enclosure 10. When the protective enclosure 10 is in a locked position (FIG. 2), sufficient retaining tension is present between the spring latch 12 and the grooves 18. Thus, the spring latch 12 is not accidentally released from its position during the typical fishing motions of an angler. The spring latch 12 serves to maintain the hooks 16 within the protective enclosure 10 during downward movement in the water. It should be understood that other ways for releasably, yet securely maintaining fishing hooks 16 within the protective enclosure 10 may be used.

Referring to FIG. 3, a diagram of the fish bait protector P having the protective enclosure 10 its unlocked position is shown. When the protective enclosure 10 is in an unlocked position, the spring latch 12 and the fishing hooks 16 are disposed above the protective disclosure 10. In this way, the fish bait protector P permits access by fish to the baited fishing hooks 16. When the protective enclosure 10 is in the unlocked position, the protective enclosure 10 is normally sufficiently distanced from the fishing hooks 16 so as not to distract or scare away fish. Further, when the protective enclosure 10 is in the unlocked state, the cap 34 prevents the weight 28 from passing through the hole 30, retaining the protective enclosure 10 on the line 14. Other ways for retaining the protective enclosure 10 when the protective enclosure 10 is in an unlocked position are also contemplated.

The protective enclosure 10 may be placed in an unlocked position by an upward pulling motion by an angler on the fishing line 26. The upward pulling motion must be of sufficient force to free the spring latch 12 from its engagement with the grooves 18 of the protective enclosure 10. An angler may thus place the protective enclosure 10 in an unlocked position when the protective disclosure 10 is at any desired depth of fish. For example, when the weight 28 contacts a bottom surface of a body of water, the force caused by such contact is sensed by the angler through the fishing line 26. The angler in response to contact with the bottom of the body of water may then exert an upward pulling force on the fishing line 26. This overcomes the force of engagement of latch 12 with enclosure 10 so as to free the spring latch 12 from its engagement with the grooves 18 of the protective enclosure 10.

By lowering the protective enclosure 10 within a body of water in a locked position and then placing the protective enclosure 10 in an unlocked position when a desired depth is reached, an angler is able to lower baited fishing hooks to low depth fish without the baited fishing hooks being disturbed by higher depth fish.

The foregoing disclosure and description of the invention are illustrative and explanatory thereof, and various changes in the details of the illustrated apparatus and construction and method of operation may be made without departing from the spirit of the invention.

We claim:

1. A fish bait protector for selectively protecting fishing hooks from fish, comprising:
   a protective enclosure having a locked position for enclosing the fishing hooks to prevent fish from accessing the fishing hooks and an unlocked position for providing the fishing hooks outside the protective enclosure for access to the fishing hooks by fish;

a release mechanism for switching the protective enclosure between the locked position and the unlocked position;

and grooves formed in the protective enclosure for engaging the release mechanism within the protective enclosure to cause the fishing hooks to be located inside the protective enclosure if in its locked position.

2. The fish bait protector of claim 1, wherein the release mechanism comprises:

a spring latch for engaging the protective enclosure to cause the fishing hooks to be located inside the protective enclosure if the protective enclosure is in a locked position and releasing the protective enclosure to cause the fishing hooks to be located outside the protective enclosure if the protective enclosure is an unlocked position.

3. The fish bait protector of claim 1, wherein the protective enclosure is in a locked position as the fishing hooks are lowered within a body of water.

4. The fish bait protector of claim 1, further comprising:

a first fishing line coupled to the release mechanism and extending to a fishing rod;

a second fishing line coupled to the release mechanism;

a plurality of leader clips coupled to the second fishing line; and a plurality of fishing hooks coupled to the plurality of leader clips.

5. The fish bait protector of claim 4, further comprising:

a leader clip coupled to an end of the second fishing line; and a weight coupled to the leader clip for contacting a bottom surface of a body of water.

6. The fish bait protector of claim 4, wherein the second fishing line comprises a leader line.

7. The fish bait protector of claim 1, further comprising:

a cap fitting over a bottom end of the protective enclosure for retaining the protective enclosure when the protective enclosure is in the unlocked position.

8. The fish bait protector of claim 1, wherein the protective enclosure is made of a material resistant to water and rusting.

9. The fish bait protector of claim 8, wherein the protective enclosure is a polyvinyl chloride (PVC) enclosure.

10. The fish bait protector of claim 8, wherein the protective enclosure is a stainless steel enclosure.

11. The fish bait protector of claim 1, wherein the protective enclosure is a tubular canister member.

12. A method of lowering fishing hooks to lower depth fish using a fish bait protector having a protective enclosure, a release mechanism and grooves formed in the protective enclosure, the method comprising the steps of:

placing the fishing hooks inside the protective enclosure;

placing the protective enclosure in a locked position by engaging the release mechanism with the grooves whereby the protective enclosure encloses the fishing hooks to prevent fish from accessing the fishing hooks;

lowering the fishing hooks and the protective enclosure into a body of water to a desired fishing depth; and placing the protective enclosure in an unlocked position by disengaging the release mechanism from the grooves whereby the fishing hooks are provided outside the protective enclosure to allow fish to access the fishing hooks when the desired fishing depth is reached.

13. The method of claim 12, the step of placing the protective enclosure in a locked position, comprising the step of:

engaging a release mechanism with the protective enclosure so that the fishing hooks are located inside the protective enclosure.

14. The method of claim 13, wherein the release mechanism is a spring latch.

15. The method of claim 12, the step of lowering the fishing hooks within a body of water comprising the step of:

lowering the fishing hooks through one fishing depth to another fishing depth.

16. The method of claim 12, the step of lowering the fishing hooks within a body of water comprising the step of:

lowering the fishing hooks to a deep fishing depth.

17. The method of claim 12, the step of placing the protective enclosure in an unlocked position comprising the step of:

placing the protective enclosure in an unlocked position if the fishing hooks are in a deep fishing depth.

18. The method of claim 12, the fish bait protector having a weight for contacting a bottom surface of a body of water, the step of placing the protective enclosure in an unlocked position comprising the step of:

placing the protective enclosure in an unlocked position if a bottom surface of the body of water contacts the weight.

19. A fishing bait protector for selectively protecting fishing hooks from fish, comprising:

a protective means, having a release mechanism and grooves formed within, for surrounding fishing hooks to prevent access by fish to the fishing hooks if the protective means is in a locked position;

a lowering means coupled to the protective means for lowering the fishing hooks inside the protective means in a locked position within a body of water; and a release means coupled to the protective means for placing the protective means in an unlocked position by releasing the fishing hooks from within the protective means when a desired fishing depth in the body of water is reached.

20. The fish bait protector of claim 19, further comprising:

a retention means coupled to the protective means for retaining the protective means when the protective means is in an unlocked position.

21. The fish bait protector of claim 19, wherein the desired fishing depth is beneath another fishing depth.

22. The fish bait protector of claim 19, wherein the desired fishing depth is a deep fishing depth.

* * * * *